United States Patent [19]

Funatsu

[11] Patent Number: 5,202,684
[45] Date of Patent: Apr. 13, 1993

[54] SYSTEM OF AN AIRCRAFT COLLISION AVOIDANCE SYSTEM FOR SUPPRESSING USELESS ALARMS

[75] Inventor: Chuhei Funatsu, Kanagawa, Japan

[73] Assignee: Toyo Communication Equipment Co., Ltd., Kanagawa, Japan

[21] Appl. No.: 511,321

[22] Filed: Apr. 19, 1990

Related U.S. Application Data

[60] Division of Ser. No. 373,205, Jun. 30, 1989, Pat. No. 4,978,945, which is a continuation-in-part of Ser. No. 65,217, Jun. 5, 1987, abandoned.

[51] Int. Cl.$^5$ .................................................. G08G 5/04
[52] U.S. Cl. ........................................ 340/961; 342/29; 342/30; 342/455; 364/461
[58] Field of Search ............... 340/961, 963; 364/461; 342/29, 30, 32, 33, 455

[56] References Cited

U.S. PATENT DOCUMENTS

| 4,121,287 | 10/1978 | Leal et al. | 364/461 |
|---|---|---|---|
| 4,792,799 | 12/1988 | Grove | 340/970 |
| 4,914,436 | 4/1990 | Bateman et al. | 340/970 |
| 4,978,945 | 12/1990 | Funatsu | 340/961 |

FOREIGN PATENT DOCUMENTS

| 0073477 | 4/1985 | Japan | 342/29 |
|---|---|---|---|
| 0065182 | 4/1986 | Japan | 342/30 |
| 8702493 | 4/1987 | PCT Int'l Appl. | 340/961 |

OTHER PUBLICATIONS

Japanese Kokai Patent Publication No. 60-73477, Funatsu, Apr. 25, 1985, English Translation.

Primary Examiner—Jin F. Ng
Assistant Examiner—Brent A. Swarthout
Attorney, Agent, or Firm—Wenderoth, Lind & Ponack

[57] ABSTRACT

The present invention is concerned with a system in which when the altitude of a subject aircraft becomes lower than a predetermined altitude, a warning limit value is reduced or made equal to zero on the minimum altitude side whereby a useless alarm based on response signals delivered from other aircraft staying in or taxiing in the airport are suppressed.

2 Claims, 4 Drawing Sheets

SYSTEM OF AN AIRCRAFT COLLISION AVOIDANCE SYSTEM FOR SUPPRESSING USELESS ALARMS

This application is a divisional of application Ser. No. 07/373,205, filed Jun. 30, 1989, now U.S. Pat. No. 4,978,945, which is a continuation-in-part of now abandoned application Ser. No. 07/065,217, filed Jun. 5, 1987.

FIELD OF THE INVENTION

This invention relates to a collision avoidance system for aircraft, and more particularly to an alarm suppressing system in an aircraft collision avoidance system wherein useless alarms which are given by the aircraft collision avoidance system with respect to other approaching aircraft are suppressed, whereby useless warning and operations by pilots are reduced as much as possible.

DESCRIPTION OF THE PRIOR ART

For avoiding aircraft collision, various systems have been heretofore proposed. In general, any of these systems measures a distance between a subject and other aircraft, and optionally measures an altitude difference and/or closing rate by a suitable method, and when these values are within a given limit value, pilots are warned that there is a dangerous situation.

More specifically, large and medium-sized aircraft are provided with aircraft collision avoidance systems which determine the positions of other aircraft approaching the subject aircraft and give an alarm; each aircraft collision avoidance system is equipped with an interrogator for interrogating other aircraft and an ATC transponder for responding to interrogation signals from other aircraft. On the other hand, small-sized aircraft such as private airplanes are only equipped with an ATC transponder in view of installation space and cost for the system.

In order to assist understanding of the present invention, the functions of an ATC transponder will be simply described herein.

Such an ATC transponder may be classified into three categories at present on the basis of the functions retained therein. The simplest type of ATC transponder is a so-called mode A transponder whose response signal contains only identifying information of the specified aircraft and which merely responds to an interrogation signal delivered from an interrogator. A device is added to the aircraft collision avoidance system by which a response signal was received, for example, which decides a relative distance by means of its received electric field intensity or a period of time necessary for interrogation or response and at the same time, detects the arrival bearing of the response signal, so that such system can also specify the bearing of the interrogator.

There is a somewhat higher-grade transponder, a so-called mode C transponder which includes altitude information in its response signal and in this case, the atmospheric pressure of flight altitude of the aircraft equipped with the transponder is employed as the altitude information.

Moreover, a transponder, so-called mode S transponder contains an identification code inherent to the aircraft in its response signal.

In an airport and its borders where aircraft converge thereinto and where accidents may also occur frequently, it is an empirically well known fact that such aircraft which respond to an interrogation signal delivered from the interrogator of an aircraft collision avoidance system are not necessarily other flying aircraft, but include ATC transponders mounted on aircraft or waiting for departure in the airport which also respond to interrogation signals.

In this respect, alarms are frequently given based on response signals from the ATC transponders mounted on these aircraft which involve no danger of collision in the sky in a conventional aircraft collision avoidance system. Thus, there is a disadvantage in that a pilot is not only troubled at the time when his attention must be concentrated on controlling the aircraft, i.e., before and after taking off and landing, but also his attention is diverted by such useless frequent alarms so that it may result in a very dangerous situation.

An example of conventional aircraft collision avoidance systems will simply be described hereinbelow in order to simplify the understanding of the present invention.

FIG. 1 is an explanatory view showing a passive type aircraft collision avoidance system in which an ATC transponder is used wherein reference numeral 1 designates a ground secondary surveillance radar which emits an interrogation signal delivered from an interrogation station 2 through an antenna 3; the interrogation signal is received and responded to by ATC transponders 7 and 8 mounted on a subject aircraft 5 and another aircraft 6 flying through a radiation pattern 4 for said interrogation signal.

In such a system, it is found that the other aircraft, as shown in FIG. 2(a), is located anywhere on the circumference of a spheroid 9 having focuses located on the ground secondary surveillance radar 1 and on the subject aircraft 5 as determined by both interrogation signal reception time T1 of the ground secondary surveillance radar 1 in the subject aircraft 5 and reception time T2+T3 of a response signal responded to by the other aircraft to the interrogation signal of the ground secondary surveillance radar 1 (according to the property of an ellipse, distances added length between a point of the circumference of an ellipse and each of its focuses are the same even if the point of the circumference of an ellipse is anywhere. Namely, it means "T2+T3=T'2+T'3"). Furthermore, since the response signal transmission intensity of the ATC transponder has previously been provided for by law, it is found that the other aircraft exists on a sphere 10 centering around the subject aircraft 5 from response signal level derived from the other aircraft. Accordingly, it is possible to specify positions of the other aircraft on points of intersections A or B between the spheroid 9 and the sphere 10, and it is also possible to know mutual distances of the subject and other aircraft.

However, the relative altitude of the subject to the other aircraft is not yet clear from only the conditions as described above. In this respect, since there is also an ATC transponder whose response signal contains altitude information as mentioned above, such a response signal is decoded to obtain the altitude information, and an altitude based on altimeter of the subject aircraft is compared with the altitude information so as to thereby specify the relative altitude of the subject to the other aircraft.

Even in such a case, where distance h of horizontal direction between aircraft each equipped with the collision avoidance system as mentioned above is small, when there is a sufficient altitude differences a, there exists little danger of an aircraft collision. Hence, there has been proposed such a system wherein the distance between aircraft as well as the altitude difference between the subject aircraft and the other aircraft is detected by including altitude information in the ATC transponder response signal, so that an alarm is given in the case where both the detected distances exceed a prescribed threshold.

In such a system, however, since the threshold is generally fixed, there has been, as mentioned above, a defect in that when an aircraft lowers its altitude to hold a landing position in the vicinity of an airport, a collision avoidance alarm will be output due to an interrogation of a response signal from either an ATC transponder mounted on an aircraft staying in the airport, or an ATC transponder mounted on an aircraft waiting for departure in spite of the fact that there is no danger of collision, so that a pilot is confused and his attention is diverted.

As mentioned above, however, since the S mode of the ATC transponder contains "ON THE GROUND" information, there is no problem if the subject aircraft effects suitable processing on the basis of this information.

Such problem still remains in mode A and C transponder response signals which do not contain "ON THE GROUND" information.

The present invention has been made to eliminate disadvantages involved in such conventional aircraft collision avoidance systems as mentioned above. An object of the present invention is to provide an alarm suppressing system in aircraft collision avoidance system wherein when the altitude of a subject aircraft becomes lower than a prescribed level, a warning limit value is reduced or made equal to zero on its minimum altitude side, whereby ATC transponder response signal of an aircraft staying in an airport is discriminated from that of a flying aircraft so as to suppress useless alarms.

SUMMARY OF THE INVENTION

Namely, the present invention is concerned with a system in which when the altitude of a subject aircraft becomes lower than a predetermined altitude, a warning limit value is reduced or made equal to zero on the minimum altitude side whereby a useless alarm based on response signals delivered from other aircraft staying in or taxiing in the airport are suppressed.

Furthermore the invention is concerned with a system wherein the atmospheric pressure at the airport in the vicinity of a subject aircraft is estimated on the basis of the altitude information of the subject aircraft and atmospheric pressure information at the altitude, and a useless alarm derived from such altitude information delivered from other aircraft staying in or taxiing in the airport is suppressed on the basis of an estimated value of the atmospheric pressure and an altitude value obtained from atmospheric pressure (information) contained in the response signal from the other aircraft responding to an interrogation signal delivered from the collision avoidance system of the subject aircraft.

Moreover the invention is concerned with a system wherein useless alarms derived from such altitude information delivered from other aircraft staying in or taxiing in an airport is suppressed on the basis of the atmospheric pressure information in the vicinity of the airport obtained by a subject aircraft from its airport control center and an altitude value obtained from atmospheric pressure information contained in the response signal from the other aircraft responding to an interrogation signal delivered from the collision avoidance system of the subject aircraft.

In accordance with the above described systems of this invention, pilots are not disturbed by useless alarms resulting from response signal delivered from other aircraft with respect to which a subject aircraft has actually no fear of colliding therewith, because these other aircraft exist at a lower altitude than that of the subject aircraft in the case of its taking off and landing.

Thus, the pilots can concentrate their attention on the most difficult taking off and landing operations, whereby safety in airline service is significantly improved.

DETAILED DESCRIPTION

The present invention will be described in more detail hereinbelow by referring to the accompanying drawings.

Figure 1:
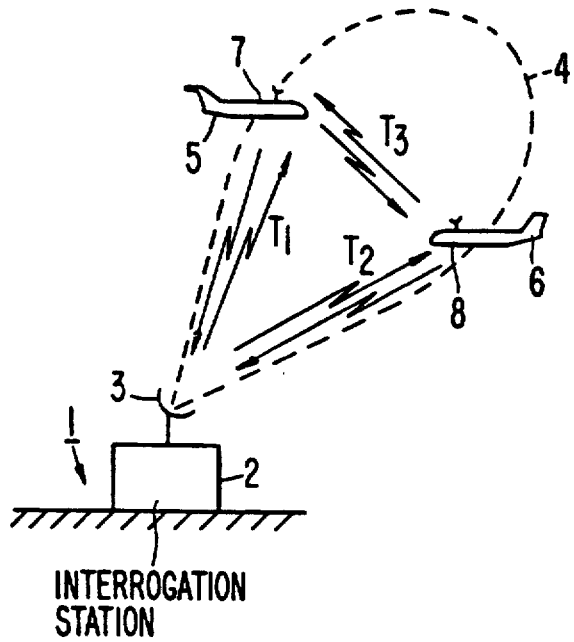
FIG. 1 is an explanatory view showing a construction of a conventional passive type aircraft collision avoidance system.
Figure 2:
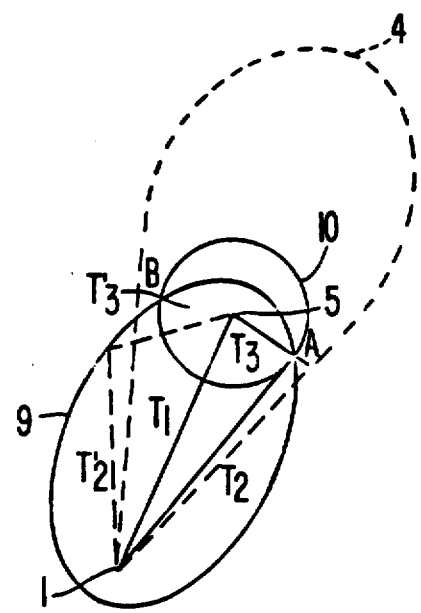
FIG. 2 is an explanatory view illustrating a method for measuring a distance in FIG. 1.
Figure 3:
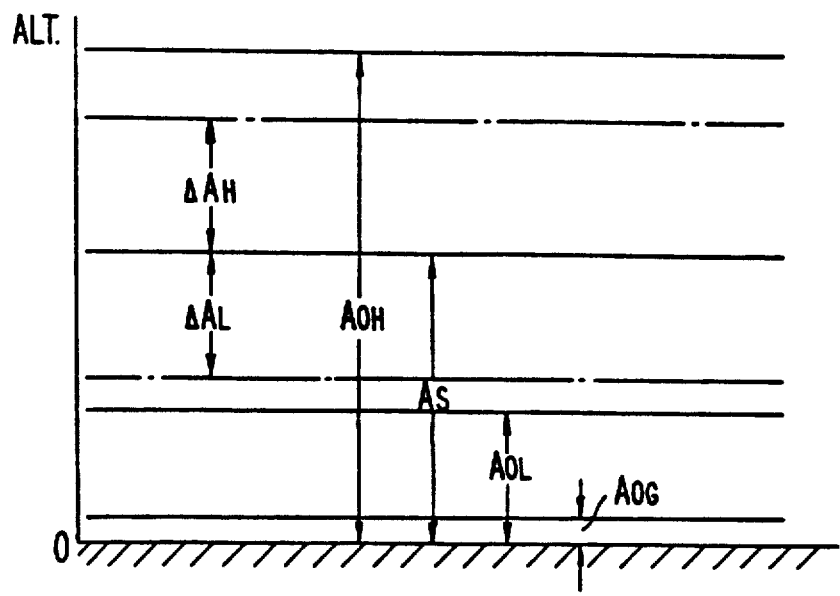
FIG. 3 is an explanatory view illustrating concept of a first embodiment of alarm suppressing system with respect to the ATC transponder response signal mode C in the aircraft collision avoidance system according to the present invention.

FIG. 3 shows one of the aircraft collision avoidance systems according to this invention in the case where ATC transponder response signal is in mode C wherein other aircraft designate AOH and AOL with respect to a subject aircraft AS, thresholds such as warning limit altitude difference $\Delta$ AH and $\Delta$ AL are provided on both the upper and lower sides of the altitude AS of the subject aircraft, and the thresholds $\Delta$ AH and $\Delta$ AL are fixed when the altitude of the subject aircraft is at least at a prescribed altitude. In this case, when AOH−AS ≦AH or AS−AOL≦Al and the distance between the subject aircraft and the other aircraft is within a given value, then an alarm is given from the system.

On one hand, when the threshold AL on the low altitude side is reduced to, for example, a value AS- −AOG (70-170 feet) obtained by subtracting a height AOG of other aircraft on the ground (around 30 feet) from the altitude AS of the subject aircraft in the case when the subject aircraft's altitude AS becomes a prescribed value, e.g., an altitude 100 through 200 feet which is directed with respect to a runway at the time of landing, the pilot is not disturbed by an alarm based on the ATC transponder response signal delivered by the other aircraft staying in the very airport until just before landing the subject aircraft.

Figure 4A:
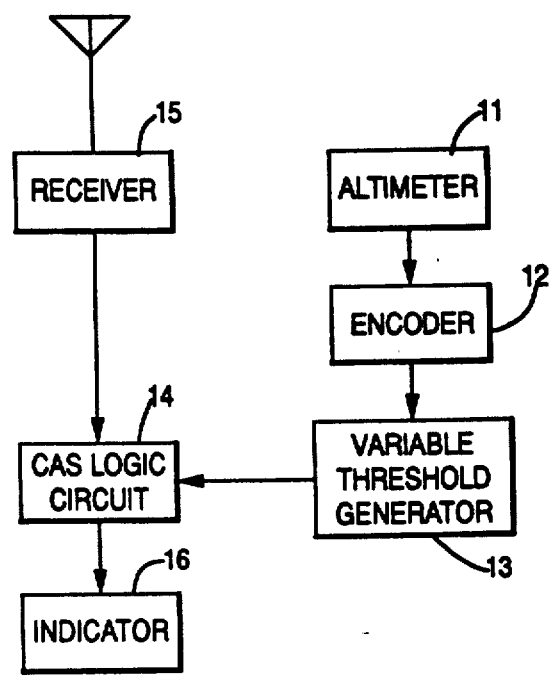
FIG. 4(a) is a block explanatory diagram showing an example for realizing the system.

FIG. 4(a) illustrates an arrangement for implementing the systems, which is adapted for operation regardless of the mode of the response signal received from other aircraft.

The output from an altimeter 11 of the subject aircraft is applied to a suitable ENCODER 12, the output of which is used to control a variable threshold generator 13 on the low altitude side to change the warning limit value AL on the low altitude side in a CAS logic circuit 14. The variable threshold generator 13 may be controlled by vary or reduce its threshold value continuously or on a stepwise basis, and in this case, the circuit 13 may also be controlled annually by the pilot.

With the above arrangement, the warning limit value AL is decreased as the subject aircraft descends to a predetermined altitude of, say, 100 to 200 feet to take up position for landing, and consequently, there is no possibility of the pilot being disturbed by useless alarms resulting from ATC transponder response signals from other aircraft staying in the airport.

To simplify the system arrangement, it is possible to employ a binary control method by which the threshold value of the variable threshold generator 13 is reduced down to zero at once when the subject aircraft descends to a predetermined altitude to prepare for landing.

Figure 4B:
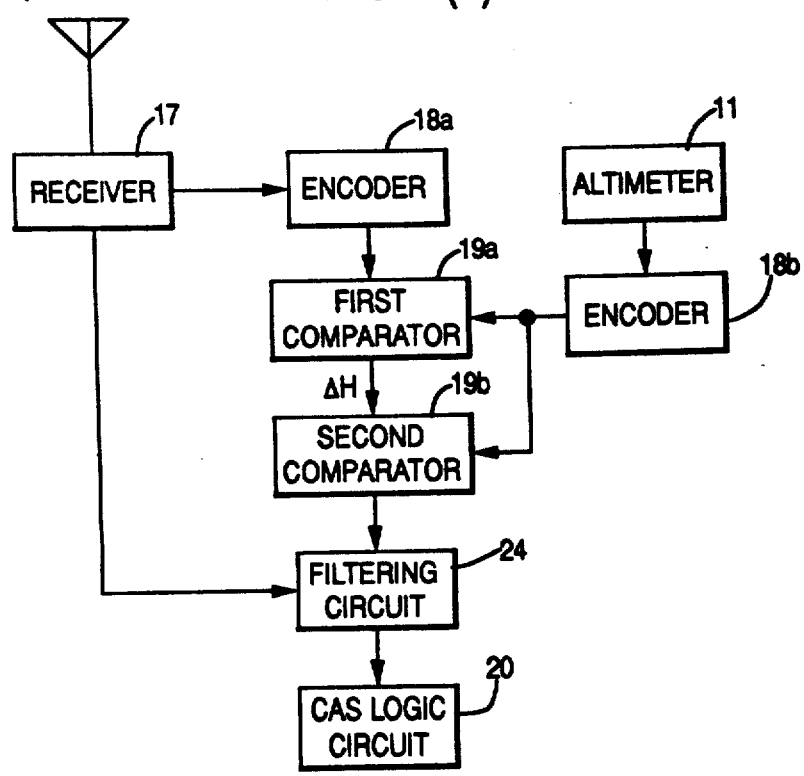
FIG. 4(b) is a block explanatory diagram showing an example for realizing the system shown in FIG. 3.

FIG. 4(b) illustrates another arrangement for implementing the system shown in FIG. 3, in which the response signal from other aircraft is the mode C signal.

An ATC transponder response signal from other aircraft, which contains its altitude information, is received by a receiver 17 of the collision avoidance equipment mounted on the subject aircraft, the altitude information is extracted by a suitable means from the received signal and converted by an encoder 18a into a required code, which is input into a comparator 19a.

On the other hand, the output from the altimeter 11 of the subject aircraft is also converted by a suitable encoder 18b into a required code, which is provided to the comparator 19a for comparison with the above-mentioned code input thereinto. An altitude difference ΔH between the subject and other aircraft is computed and this computed output is applied to a second comparator 19b, which is being supplied with the altitude information of the subject aircraft from the altimeter 11. The second comparator 19b compares the altitude difference ΔH and the altitude of the subject aircraft. When they are substantially equal, it is determined that the other aircraft is staying on the ground, and a filtering circuit 21 is controlled to inhibit the application of the received signal from the receiver 17 to a CAS logic circuit 20.

Thus, those of the response signals received by the subject aircraft which are delivered from other aircraft staying on the ground are not applied to the CAS logic circuit 20. This ensures preventing the generation of useless alarms which distract the attention of the pilot of the subject aircraft in position for landing.

While the above embodiments have been described to employ two comparators, it is also possible to use only one comparator which is equipped with the required functions mentioned above.

Figure 5:
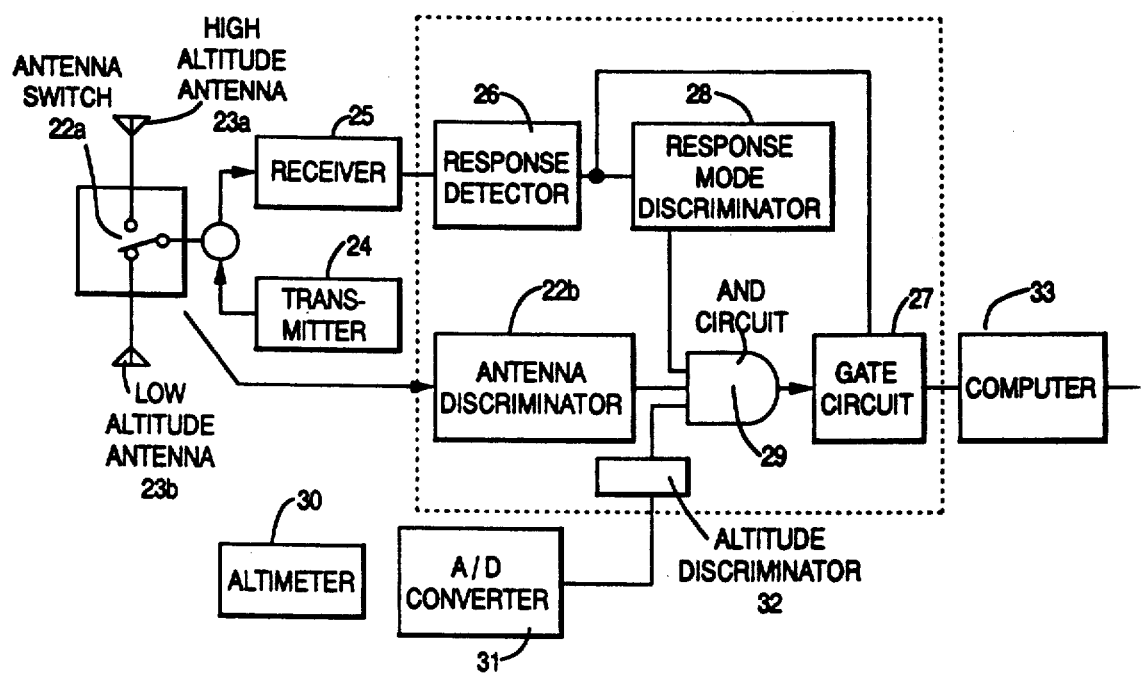
FIG. 5 is a block explanatory diagram for realizing a system which conducts processing with respect to ATC transponder response signal mode A.

FIG. 5 illustrates an example of a system which suppresses a response signal of mode A which does not include altitude information in its signal according to the present invention. An antenna alteration switch 22a electrically switches to an antenna 23a or to an antenna 23b continuously. For example, when a low altitude antenna 23b is connected, an interrogation signal from a transmitter 24 through the low altitude antenna 23b is outputted to an ATC transponder mounted on other aircraft existing in an airport and its borders by the antenna 23b. The transponder mounted on other aircraft which received the interrogation signal output response signals, and the response signals are received again by a receiver 25 through the low altitude antenna 23b. The output from the receiver 25 is fed to a gate circuit 27 and a response mode discriminator 28 through a response detector 26. The response mode discriminator 28 outputs a digital signal "1" to an AND circuit 29 when the received response signal is in mode A of the ATC transponder, and the response mode discriminator 28 outputs a digital signal "0" to the AND circuit 29 when the received response signal is in mode C or S of the ATC transponder. Furthermore, when the antenna alteration switch 22a is connected to high altitude antenna 23a, an antenna discriminator 22b outputs a digital signal "0" to the AND circuit 29, and the antenna discriminator 22b outputs a "1" to the AND circuit 29 when the switch 22a is connected to the low altitude antenna 23b.

Moreover, altitude information from an altimeter 30 is converted from analog signal into digital signal by an A/D converter 31, and the digital altitude information from the A/D converter 31 is inputted to an altitude discriminating circuit 32. The altitude discriminating circuit 32 outputs a "1" to the AND circuit 29 when the altitude of a subject aircraft is, for example, 1000 feet or less, and output a "0" to the AND circuit 29 when the altitude of the subject aircraft is more than 1000 feet.

Furthermore, the gate circuit 27 is blocked when a "1" is output from the AND circuit 29, and the gate circuit 27 is in a transmittal state when a "0" is output by the AND circuit 29. Namely, when a "1" is output from the AND circuit 29, output of the response detector 26 is blocked by the gate circuit 27 and is not inputted into a computer 33. On the other hand, when a "0" is output from the AND circuit 29, the output of the response detector 26 is transmitted through the gate circuit 27 and input into the computer 33.

Figure 6:
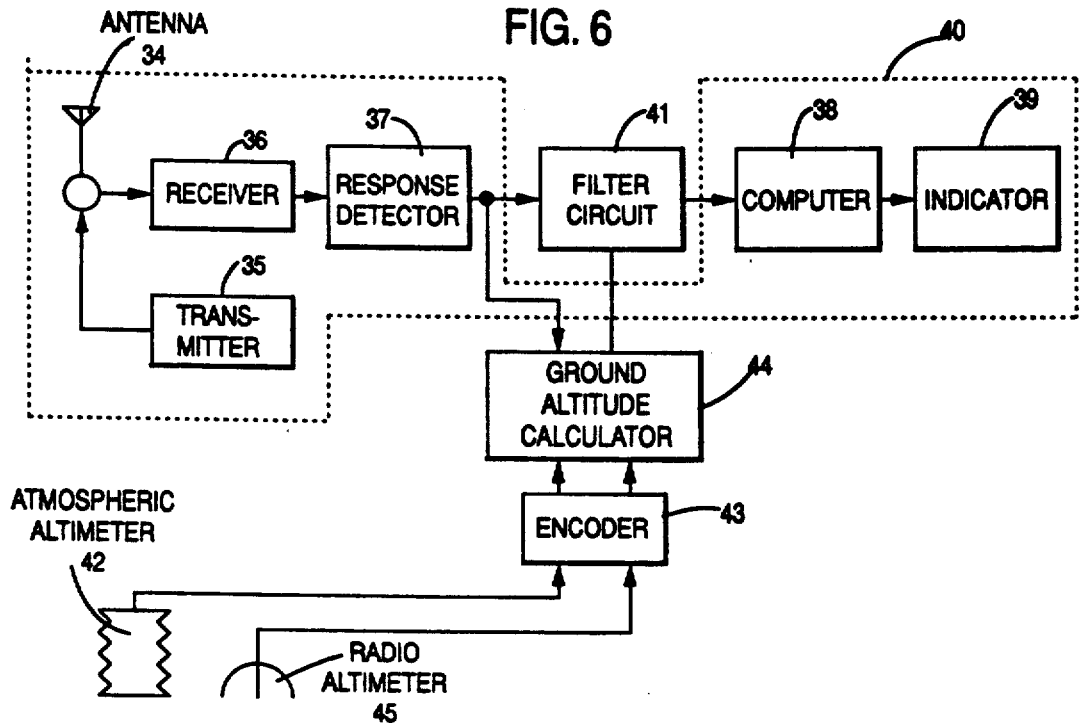
FIG. 6 is a block explanatory diagram illustrating a second embodiment of alarm suppressing system with respect to the ATC transponder response signal mode C in the aircraft collision avoidance system according to the present invention.

FIG. 6 illustrates the second embodiment in which ATC transponder response signal is in mode C among the alarm suppressing systems in aircraft collision avoidance system according to the present invention wherein a block 40 encircled with a dot and chain line is a typical aircraft collision avoidance system wherein an interrogation signal is transmitted from a transmitter 35 through an antenna 34 and is received again by the antenna 34 after having been transformed as a response signal of the ATC transponder mounted on another aircraft existing in an airport and its borders; the contents of the response signal are analyzed in a computer 38 after passing through a receiver 36 and a response detector to 37 and filter circuit 41, and if necessary the analyzed result is indicated on an indicator 39.

In the present invention, the filtering circuit 41 for determining whether or not other aircraft are on the ground is placed between the response detector 37 and computer 38.

Furthermore, the system of the second embodiment is constructed such that absolute altitude information derived from an atmospheric altimeter 42 mounted on the subject aircraft is encoded by an encoder 43; the encoded information is inputted to a ground altitude calculating machine 44 to estimate a surface atmospheric pressure in an airport and its borders.

This estimation can be achieved through utilization of the following formula heretofore employed:

$$h = 18400(1 + 0.00366 \times t) \log(PO/P)$$

where h is altitude (m), t temperature (° C), PO the atmospheric pressure on the ground (mb), and P the atmospheric pressure at the altitude h (m). For example, in the case where the mean temperature in the atmosphere is 10° C., the absolute altitude of 1000 m is 910 mb, the atmospheric pressure PO on the ground can be computed as follows:

$$1000 = 18400(1 + 0.00366 \times 10) \log(PO/910)$$

$$PO = 910 \times 1.128 = 1026.5 \text{ mb}.$$

The atmospheric pressure thus obtained is compared with altitude information derived from atmospheric pressure information contained in the mode C response signal available from the response detector 37. Then it is determined, on the basis of the result of comparison, whether or not the ATC transponder response signal received is delivered from the aircraft on the ground, while taking a certain possible error into consideration, so that if the response signal is one delivered from the aircraft on the ground, a signal for inhibiting the operation of the filtering circuit 41 is supplied thereto, reference numeral 15 designates a radio altimeter.

Figure 7:
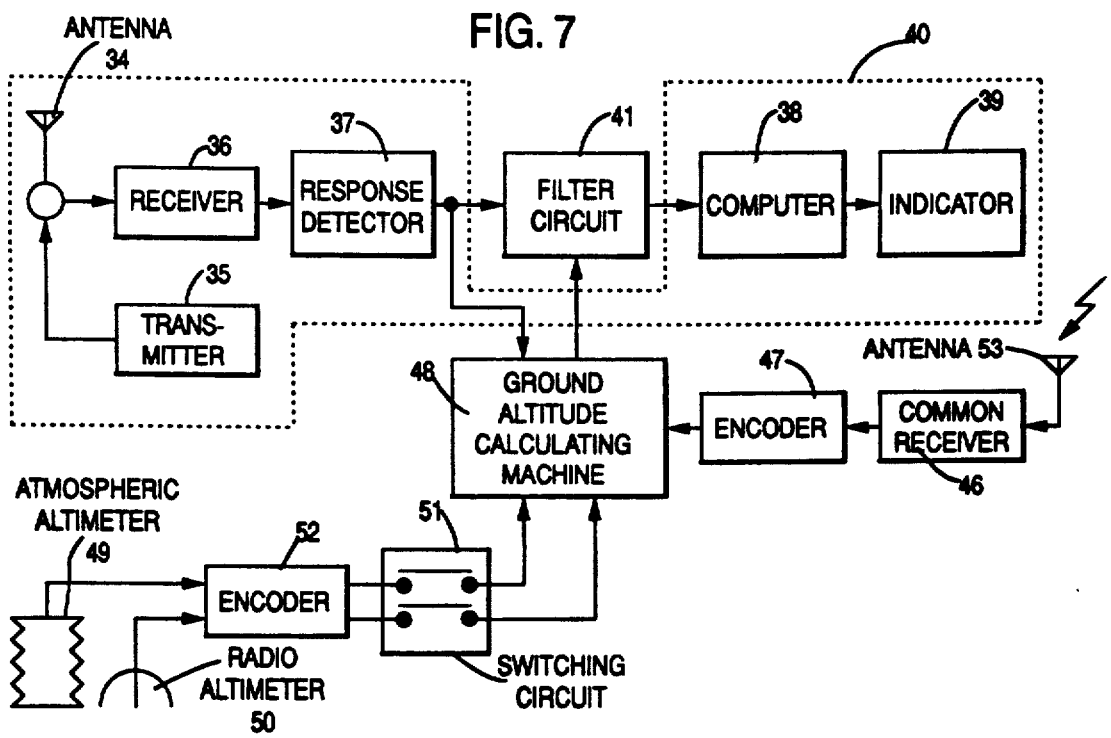
FIG. 7 is a block diagram showing a modification of FIG. 6.

FIG. 7 illustrates a modified form of the embodiment shown in FIG. 6. The parts corresponding to those in FIG. 6 are identified by the same reference numerals. In general, an airport control center always provides information concerning the surface atmospheric pressure at the safety of its landing. This embodiment is designed to utilize such atmospheric pressure information available from the airport control center, instead of obtaining the ground atmospheric pressure from the altitude information and the atmospheric pressure information of the subject aircraft as described above in connection with FIG. 6. In this embodiment, the ground atmospheric pressure information received through a common receiver 46 is encoded by an encoder 47 and the encoded information is inputted manually into a ground altitude calculating machine 48. The input information and altitude information contained in the ATC transponder response signal received from other aircraft are compare with each other through utilization of the aforementioned altitude measuring formula and so forth. In this instance, information available from a pressure altimeter 49 and a radio altimeter 50 of the subject aircraft are prevented by a switching circuit 51 from being input into the ground altitude calculating machine 48.

Figure 8:
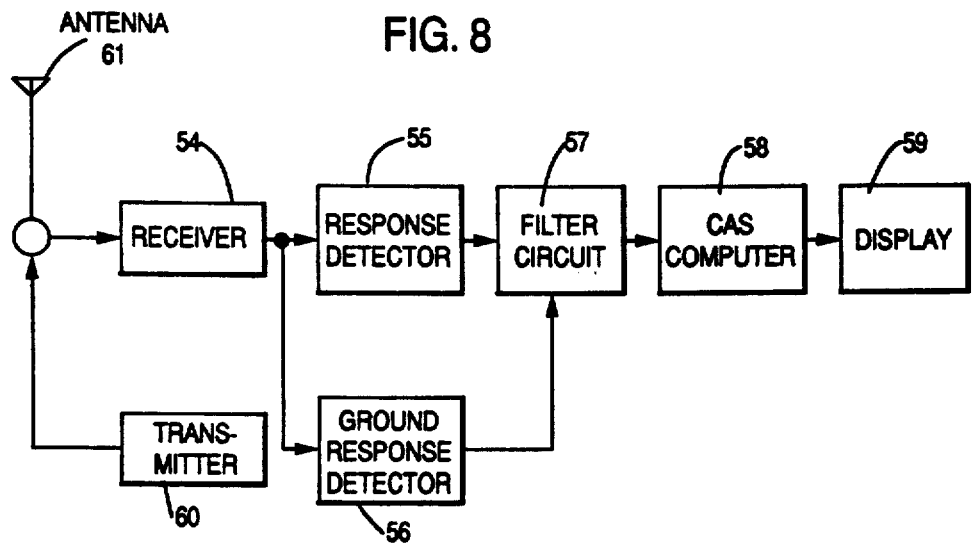
FIG. 8 is a block explanatory diagram for realizing a system which conducts processing with respect to ATC transponder response signal mode S.

FIG. 8 illustrates in block form an arrangement for processing the ATC transponder response signal of mode S. The mode S transponder response signal contains a ground signal indicating that the aircraft transmitting the response signal stays on the ground. The output of a receiver 54 is applied to a response signal detector 55 and a ground response detector 56. Where the above-mentioned ground signal is contained in the received signal, a filtering circuit 57 is controlled to inhibit the application of the output from the response detector 55. Where no ground signal is contained, the received response signal is provided to a CAS computer 56, wherein it is determined whether or not the subject aircraft is in danger of colliding with other aircraft.

Thus this embodiment prevents, for the mode S transponder response signal, the generation of useless alarms without the necessity of comparing the altitudes of the subject and other aircraft. Reference numeral 59 indicates a display, 60 a TRANSMITTER, and 61 an antenna.

As described above, the alarm suppressing system in an aircraft collision avoidance system according to the present invention can remarkably decrease the possibility of a pilots' mental concentration being disturbed by useless alarms from the aircraft collision avoidance system in, of course, such an area where most of the aircraft are provided with mode C ATC transponders as in Japan and Europe, and even in areas where there are also aircraft equipped with modes C and A ATC transponders and in addition, a proportion of small-sized airplanes equipped only with a mode A ATC transponder as in the United States of America. Accordingly, the alarm suppressing system in accordance with the present invention is useful for safe airline service, and is particularly suitable for maintenance of safety at the time of taking off and landing of aircraft.

What is claimed is:

1. A system for suppressing useless alarms of an aircraft collision avoidance system which has a function of determining whether or not a subject aircraft is in danger of colliding with another aircraft and which generates an alarm when it has determined that the subject aircraft is in danger of colliding with another aircraft, through utilization of a response signal received from the other aircraft, said system for suppressing useless alarms comprising a variable threshold generator and said collision avoidance system comprising:

a receiver for receiving at least said response signal from the other aircraft;

a collision avoidance system logic circuit which receives said response signal received by said receiver and which is controlled in accordance with a threshold valve output by said variable threshold generator, said logic circuit for actuating an alarm when a difference between an altitude of the other aircraft denoted by said response signal and an altitude of said subject aircraft is within the threshold value; and a display which is controlled by an output of said collision avoidance system logic circuit;

said system for suppressing useless alarms comprising:

an altitude information detector for obtaining altitude information of said subject aircraft;

an encoder for encoding an output of said altitude information detector into a coded signal; and, said variable threshold generator is controlled in response to said coded signal output by said encoder of said altitude information detected by said altitude information detector;

wherein when said subject aircraft descends to a predetermined altitude, the threshold value output by said variable threshold generator is reduced according to an altitude of said subject aircraft so as to thereby prevent an alarm from being generated on the basis of said response signal from said other aircraft located at an altitude which is lower than an altitude value resulting from subtracting said threshold value from said altitude of said subject aircraft, whereby the generation of a useless alarm is suppressed.

2. A system for suppressing useless alarms of an aircraft collision avoidance system which has a function of determining whether or not a subject aircraft is in danger of colliding with another aircraft and which generates an alarm when it has determined that the subject aircraft is in danger of colliding with another aircraft, through utilization of a response signal received from the other aircraft, said system for suppressing useless alarms comprising a variable threshold generator and said collision avoidance system comprising:

a receiver for receiving at least said response signal from the other aircraft;

a collision avoidance system logic circuit which receives said response signal received by said receiver and which is controlled in accordance with a threshold value output by said variable threshold generator, said logic circuit for actuating an alarm when a difference between an altitude of the other aircraft denoted by said response signal and an altitude of said subject aircraft is within the threshold value; and a display which is controlled by an output of said collision avoidance system logic circuit;

said system suppressing useless alarms comprising:

an altitude information detector for obtaining altitude information of said subject aircraft;

an encoder for encoding an output of said altitude information detector into a coded signal; and, said variable threshold generator which is controlled in response to said coded signal output by said encoder of said altitude information detected by said altitude information detector;

wherein when said subject aircraft descends to a predetermined altitude, the threshold value of said variable threshold generator is made equal to zero so as to thereby prevent an alarm from being generated on the basis of said response signal from said other aircraft located at an altitude which is lower than said subject aircraft, whereby the generation of a useless alarm is suppressed.

* * * * *